США011358085B2

(12) United States Patent
Wystup et al.

(10) Patent No.: US 11,358,085 B2
(45) Date of Patent: Jun. 14, 2022

(54) DEVICE AND METHOD FOR DETECTING FILTER CLOGGING

(71) Applicant: ebm-papst Mulfingen GmbH & Co. KG, Mulfingen (DE)

(72) Inventors: Ralph Wystup, Künzelsau (DE); Markus Humm, Neißbach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 280 days.

(21) Appl. No.: 16/481,728

(22) PCT Filed: Jan. 18, 2018

(86) PCT No.: PCT/EP2018/051169
§ 371 (c)(1),
(2) Date: Oct. 4, 2019

(87) PCT Pub. No.: WO2018/137988
PCT Pub. Date: Aug. 2, 2018

(65) Prior Publication Data
US 2020/0030732 A1 Jan. 30, 2020

(30) Foreign Application Priority Data
Jan. 30, 2017 (DE) .......................... 102017101695.3

(51) Int. Cl.
*B01D 46/00* (2022.01)
*B01D 46/46* (2006.01)
(Continued)

(52) U.S. Cl.
CPC ....... *B01D 46/0086* (2013.01); *B01D 35/143* (2013.01); *B01D 46/46* (2013.01);
(Continued)

(58) Field of Classification Search
CPC ........ B60H 2003/0683; B01D 46/0086; B01D 46/44; B01D 46/46; B01D 35/143;
(Continued)

(56) References Cited

U.S. PATENT DOCUMENTS 8,328,905 B2 * 12/2012 Matsuzaki ......... B01D 46/0086
95/25
2010/0001677 A1 1/2010 Woo et al.
(Continued)

FOREIGN PATENT DOCUMENTS

CN WO2015176439 A1 * 11/2015 ......... B01D 46/0086
DE 40377685 A1 6/1992
(Continued)

OTHER PUBLICATIONS

DE102005023371A1_ENG (Espacenet machine translation of Kellermann) (Year: 2006).*
(Continued)

*Primary Examiner* — Jonathan Miller
*Assistant Examiner* — Gabriel E Gitman
(74) *Attorney, Agent, or Firm* — Dickinson Wright PLLC

(57) ABSTRACT

The present disclosure relates to a device and to a method for detecting filter soiling of a filter system having at least an air filter installed in an air duct and an electrically controlled fan for producing an air flow in the air duct, wherein the device comprises at least a motor controller for controlling the fan motor by means of PWM control and an evaluating apparatus for determining the actual rotational speed ($n_i$) of the fan in accordance with the actual degree of modulation ($T_i$) of the motor current for achieving the present rotational speed ($n_i$), wherein, in the evaluating apparatus, setpoint value pairs ($n_{setpoint}$, $T_{setpoint}$) for the setpoint rotational speed ($n_{setpoint}$) at a certain degree of modulation ($T_{setpoint}$) are also stored, as well as a comparator in order to compare
(Continued)

the actual value pairs ($n_i$, $T_i$) with the setpoint value pairs ($n_{setpoint}$, $T_{setpoint}$) and to obtain the degree of filter soiling of the air filter therefrom.

12 Claims, 1 Drawing Sheet

(51) Int. Cl.
  *B01D 35/143* (2006.01)
  *H02P 27/08* (2006.01)
(52) U.S. Cl.
  CPC .......... *B01D 2279/50* (2013.01); *H02P 27/08* (2013.01); *Y10S 116/25* (2013.01)
(58) Field of Classification Search
  CPC .... B01D 2279/50; H02P 27/08; Y10S 116/25; F02M 35/09; F24F 11/30; F24F 11/39; F24F 11/64
  See application file for complete search history.

(56) References Cited

U.S. PATENT DOCUMENTS

2013/0197826 A1    8/2013  Ahola et al.
2013/0288585 A1 * 10/2013  Hoke .................. B60H 3/0616
                                                                454/75

FOREIGN PATENT DOCUMENTS

| DE | 102005023371 A1 | * | 11/2006 | ......... B01D 46/0086 |
| DE | 102014109554 A1 | * | 1/2016 | ........... F04D 19/002 |
| EP | 2141038 A1 | | 1/2010 | |
| JP | H10 160228 A | | 6/1998 | |
| JP | H10160228 A | * | 6/1998 | .............. F24F 11/02 |
| JP | 2015030564 A | | 2/2015 | |
| KR | 100632148 B1 | | 10/2006 | |
| WO | 0219511 | | 7/2002 | |
| WO | 2006/033027 A1 | | 3/2006 | |
| WO | 2006033027 A1 | | 3/2006 | |

OTHER PUBLICATIONS

WO2015176439A1_ENG (Espacenet machine translation of Li) (Year: 2015).*
JPH10160228A_ENG (J-Pat-Plat machine translation of Nakayama) (Year: 1998).*
DE102014109554A1_ENG (Espacenet machine translation of Hirt) (Year: 2016).*
International Search Report dated Mar. 4, 2018.
German Search Report dated Jul. 21, 2017.
International Search Report and Written Opinion in German.

* cited by examiner

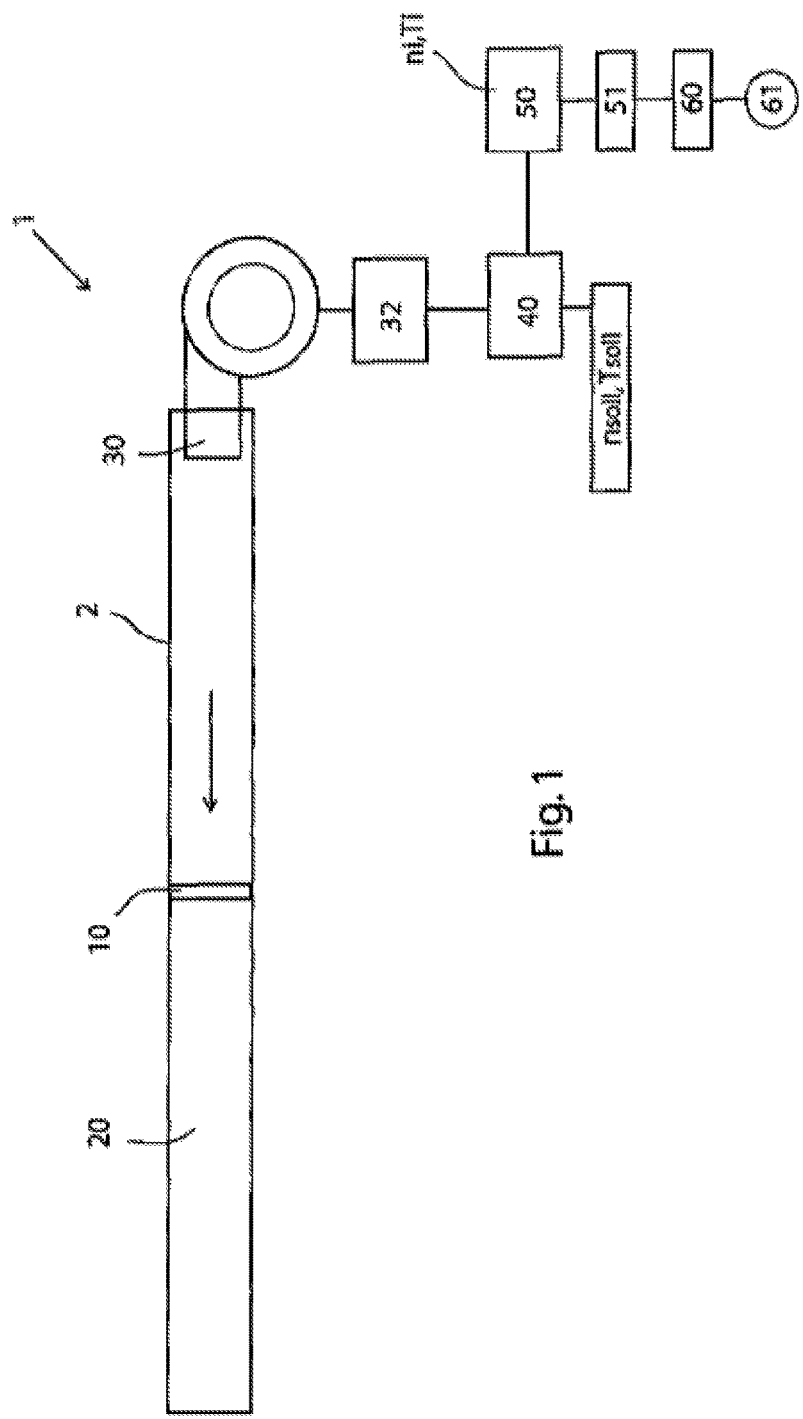
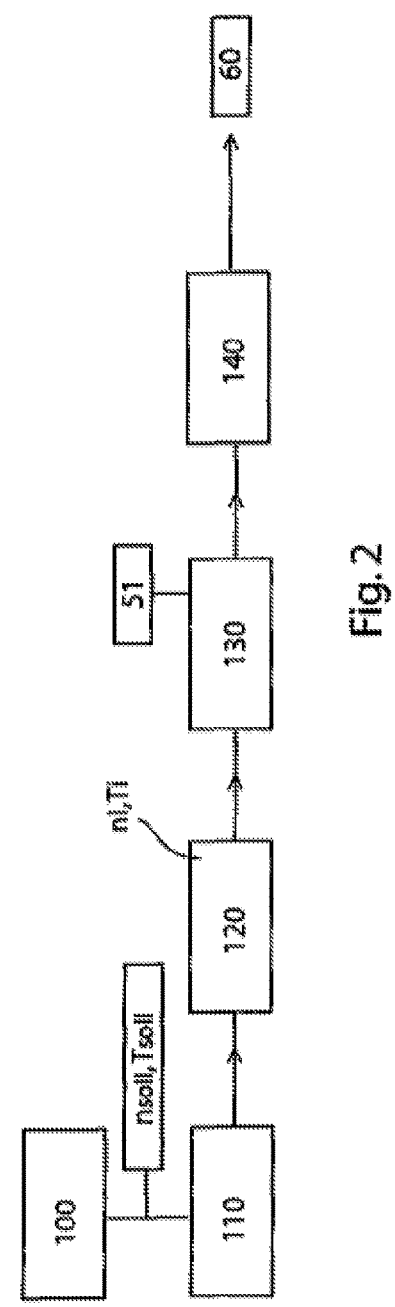
Fig. 1
Fig. 2

DEVICE AND METHOD FOR DETECTING FILTER CLOGGING

RELATED APPLICATIONS

This application claims priority to German Patent Application No. 10 2017 101 695.3, filed Jan. 30, 2017, and PCT/EP2018/051169, filed Jan. 18, 2018, the entire contents of which are incorporated herein by reference in their entirety.

FIELD

The present disclosure relates to a device and to a method for detecting and measuring filter soiling.

BACKGROUND

In addition to fans, filters are typically used for air purification in ventilation systems. With many devices, the user cannot readily determine from the exterior whether the filter is already soiled or fraught with dirt particles such that it would have to be cleaned or replaced.

The determination and measurement of filter soiling in the prior art is implemented, e.g., with additional sensors or equipment such as, for example, with an infrared sensor for measuring filter soiling. With an infrared filter, the degree of soiling is measured, for example, in such a manner that an infrared light source is radiated into the filter and reflected back onto the opposite side by the reflector attached there, and measured. If the filter is only slightly soiled, much light is reflected; if it is extensively soiled, hardly any light appears at the measuring point. The electronic system calculates the degree of soiling from this difference in the radiation intensity. If no more light is reflected, the system also switches off, e.g., the current supply of the fan in the affected air duct.

A different method is the measurement of differential pressure upstream and downstream of the filter, wherein the differential pressure can be measured with increasing filter soiling thus providing conclusions regarding the degree of soiling. The disadvantage with this is that it requires additional measuring equipment, and the differential pressure can change based on other flow influences.

DE 4037685 A1 discloses a filter inspection device for the interior air filters of motor vehicles having an electric fan motor with a filter arranged in its suction area and an electronic fan motor rotational speed controller. The fan motor rotational speed controller and a climate-control unit are connected to outputs of a central control unit, by means of which an automatic filter inspection process can be implemented via a control program and at the inputs of which signal processing equipment as well as an in-rush current ammeter are connected via an analog/digital converter. To this end, separate measuring and control equipment is also necessary, which should be avoided simply for cost reasons.

The degree of filter soiling furthermore influences the required torque of the fan in a ventilation system such that the motor parameters must be permanently changed and the fan is also increasingly working in a suboptimal operating range.

BRIEF SUMMARY

Therefore, the present disclosure provides a simple, cost-effective concept for detecting and/or measuring filter soiling, which can be implemented with a small number of components.

in one form, this object is achieved by the combination of features according to claim 1.

In a closed air flow channel or space, a fan such as, e.g., a radial fan establishes a pressure ("pressure accumulator"); in idle mode, this pressure can then release and thus act on the braking behavior of the fan. Depending on the degree of soiling and the air permeability of the filter, the pressure is more quickly or more slowly established and released.

One idea of the present disclosure is to provide a detection method for detecting filter soiling of an air filter in a flow range of a fan, with which the relation between the power consumption of the fan and its actual degree of modulation (e.g., pulse width modulation (PWM) control) as well as the actual rotational speed can be used to draw a conclusion about filter soiling.

The determination of the power consumption of the fan can be compensated by a stored characteristic curve and thus made precise if an integrated measuring circuit is functioning too imprecisely. Upon its commissioning with a clean filter, the fan follows its fan characteristic curve and, in doing so, records a sufficient number of actual rotational speeds and actual degrees of modulation as value pairs. The measuring of a characteristic curve can alternatively take place by recording an existing characteristic curve, e.g., by means of a data bus, in that data, from a database, suitable according to the installation situation and the selected filter type can be used.

In addition, with the method according to the present disclosure, the intermediate circuit voltage and the intermediate circuit current are recorded. These data are stored in a fan memory and a conclusion about filter soiling can be drawn directly therefrom.

A positive side effect of the method according to the present disclosure is that the aging process of the fan is slowed. Aging refers, for example, to the wear of the bearing, for which there are already corresponding service life calculation models. Alternatively, parameters determining bearing service life can also be measured by means of corresponding sensors.

With a method according to the present disclosure, the fan compares the current actual rotational speed and the actual degree of modulation in ongoing operation to the corresponding stored setpoint data. According to the disclosure, a comparison of value pairs thus takes place. If a stored degree of modulation according to a stored rotational speed value deviates from the current actual degree of modulation of the current actual rotational speed value by more than a specified permissible deviation value, this condition is evaluated as filter soiling, because the degree of modulation must be increased with filter soiling in order to reach the desired rotational speed that would be present with a non-soiled or only slightly soiled filter.

By means of recording the interim circuit voltage and the interim circuit current, the method is further secured and there is a determination as to whether the deviation is not from the fan (e.g. bearing damage) or originates from the control circuit for the fan. According to the disclosure, a tolerance range with maximum values and minimum values is defined for the degree of permissible deviation.

The report of a soiled filter can take place as a warning on the bus, as a flashing code of an LED, or as a set fault signal relay. The fault signal can also be generated externally by means of a suitable interface.

Due to the methods according to the present disclosure, a complex and possibly vulnerable sensor system, which is additionally cost-increasing, is superfluous. In contrast, the solution according to the disclosure only provides an evaluation unit, in which relations between the rotational speed and the degree of modulation are used, as well as the interim circuit voltage and the interim circuit current.

According to one idea of the disclosure, the degree of soiling can be calculated when the deviation of the actual values from the setpoint values has a linear character and the absolute deviation is determined. The value determined in this manner can be queried via a data bus or may be present as an analog voltage signal on a signal output. Preferably, a low voltage would be evaluated as minimal soiling and a maximum permissible voltage of the analog signal would be evaluated as maximally permissible soiling.

The time-discrete or continuous recording of the values over time can likewise be evaluated and a gradual change in filter soiling up to a maximum permissible degree of soiling can also be detected from the derivation according to time. If the first derivation according to time is somewhat constant in this case, continuous and increasing filter soiling can be derived therefrom.

In an alternative embodiment of the present disclosure, it may be provided to reverse the rotational direction of the fan for a defined time and, in doing so, the actual degree of modulation, the actual rotational speed, and the intermediate circuit current and the intermediate circuit voltage are continuously recorded.

In this case, the change rate of the PWM signal while blowing the filter clear is evaluated during reverse operation, wherein, by incorporating the specific parameters of the fan, the circumstance in which fan wheels are typically technically optimized based on a forward rotational direction and the fans in the reverse rotational direction thus only achieve a limited air performance is compensated.

According to the disclosure, a rotational speed jump to the fan is provided, and its jump response recorded and evaluated, in a further embodiment. The filter functions as a low-pass in this case. The output characteristic variable here is the actual PWM signal. If the filter is just slightly soiled, it subsides very quickly; if the filter is greatly soiled, it subsides only slowly. Thus, the change rate of the actual PWM is considered. This embodiment is similar to the previously mentioned method of the reverse operation except that no compensation must be made for the poorer air performance of the fan wheels in reverse operation.

In a further embodiment of the disclosure, the filter is additionally described by mathematical parameters in a model. The jump response provides actual values of these parameters, which are then compared with the ideal values from the model. Such filter parameters can be obtained, inter alia, by means of Kalman filters or other gradient methods. An evaluation of the tendency over time also takes place here.

A further embodiment of the present disclosure provides that the fan can be used as a loudspeaker with the assistance of its blades due to a precise modulation of the motor current with a sinusoidal carrier signal known in phase and amplitude. It is the property of a loudspeaker that it can also receive oscillations, i.e. tones. The tones received by the ventilator are then expressed as changes in the motor current provided that a phase displacement and amplitude reduction occur in the motor current for the generated signals. A filter then dampens these ultrasound signals as a function of its soiling such that the received signal provides information on the degree of soiling both in amplitude and in the phase position. The evaluation of the signals in the current of the fan motor can take place, for example, by correlating the transmitted signals with the received signals. Interfering signals in this case can also be hidden by means of a variation in the transmit frequency.

Other advantageous refinements of the present disclosure are characterized in the dependent claims and/or are shown in more detail in the following, by means of the figures, along with the description of the preferred embodiment of the disclosure.

BRIEF DESCRIPTION OF THE DRAWINGS

The following is shown in the drawings:
FIG. 1 a schematic view of a device according to the present disclosure; and
FIG. 2 a schematic representation of the steps of the method according to the present disclosure.

DETAILED DESCRIPTION

The present disclosure is described in the following using an exemplary embodiment, wherein use of the same reference characters indicates the same structural and/or functional features.

FIG. 1 shows a schematic view of an exemplary embodiment of a device 1 for detecting filter soiling in the filter system 2, wherein the filter system 2 consists of at least an air filter 10 installed in an air duct 20 and an electrically controlled fan 30 creating an air flow in the air duct 20. The device 1 has a motor controller 40 for controlling the fan motor, wherein a PWM control 32 is provided for regulating rotational speed. Furthermore, an evaluating apparatus 50 for determining the actual rotational speed $n_i$ of the fan 30 as a function of the actual degree of modulation (duty cycle) of the engine current is provided for achieving the current rotation speed $n_i$.

Furthermore, setpoint value pairs $n_{setpoint}$, $T_{setpoint}$ for the setpoint rotational speed $n_{setpoint}$ of the filter system 2 at a certain degree of modulation $T_{setpoint}$ are stored in the evaluating apparatus 50. Moreover, a comparator 51 is provided in the device in order to compare the respective actual value pairs $n_i$, $T_i$ with the stored setpoint value pairs $n_{setpoint}$, $T_{setpoint}$ and from that determine the degree of filter soiling of the air fan 10. As soon as the deviation is greater than a specified limit value in a tolerance range, a signal is output to the LED light 61 via the interface 60, which indicates impermissible filter soiling.

FIG. 2 shows a schematic representation of the steps of the detection method according to the disclosure for determining filter soiling of a filter system, which can be implemented with the device according to FIG. 1. The following steps are provided with the method.

First, the recording or transmission of the motor characteristic curve related to the rotational speed as a function of the degree of modulation in the filter system 2, in which the air filter 10 is not soiled, thus, e.g., during system startup or a filter replacement, takes place in one step 100.

These value pairs are stored as setpoint value pairs $n_{setpoint}$, $T_{setpoint}$ in a data memory of the device 1 in step 110.

During system operation, the respective determination of the actual rotational speed $n_i$ of the fan 30 and of the actual degree of modulation $T_i$ of the motor current takes place to achieve the current actual rotational speed $n_i$ in a step 120.

In a further step 130, there is a comparison of the actual value pairs $n_i$, $T_i$ with the stored setpoint value pairs $n_{setpoint}$, $T_{setpoint}$ with the comparator 51 of the device 1.

Subsequently, in step 140, the determination takes place as to whether the determined deviation of the actual value pairs $n_i$, $T_i$ from the setpoint value pairs $n_{setpoint}$, $T_{setpoint}$ exceeds a maximum predefined deviation. The deviation in this case can be determined as a range deviation in a permissible tolerance range, wherein either the rotational speed at a certain power consumption and thus a certain duty cycle is too low or whether an excessively high duty cycle is required in order to achieve a certain rotational speed. In particular, when the deviation of the actual values from the setpoint values has a linear characteristic over time, not only the current filter clogging but also the time of the maximally permissive soiling, at which a filter change should take place, can be predicted from the increasing deviation.

The invention claimed is:

1. A device for detecting filter soiling of a filter system having at least an air filter installed in an air duct and an electrically controlled fan having a fan motor for producing an air flow in the air duct, wherein the device comprises:
   at least a motor controller for controlling the fan motor by means of pulse width modulation (PWM) control, and
   an evaluating apparatus for determining an actual rotational speed ($n_i$) of the fan in accordance with an actual degree of modulation ($T_i$) of a motor current for achieving the actual rotational speed ($n_i$), wherein, in the evaluating apparatus, setpoint value pairs ($n_{setpoint}$, $T_{setpoint}$) for a setpoint rotational speed ($n_{setpoint}$) at a setpoint degree of modulation ($T_{setpoint}$) are also stored, the evaluating apparatus including a comparator which is configured to compare the actual value pairs ($n_i$, $T_i$) with the setpoint value pairs ($n_{setpoint}$, $T_{setpoint}$) and to obtain a degree of filter soiling of the air filter therefrom as well as from an intermediate circuit voltage and an intermediate circuit current.

2. A detection method with the device according to claim 1, wherein the degree of filter soiling is obtained from a power consumption of the fan motor without using sensors in that an actual power consumption, which can be determined by the actual value pairs ($n_i$, $T_i$), is compared to a defined setpoint power consumption of an unsoiled filter system in the comparison, which can be determined by the setpoint value pairs ($n_{setpoint}$, $T_{setpoint}$), wherein the intermediate circuit voltage and the intermediate circuit current are recorded and used in the evaluation of the degree of filter soiling.

3. The detection method according to claim 2, having the following steps:
   a. determining the actual rotational speed ($n_i$) of the fan,
   b. determining the actual degree of modulation ($T_i$) of the motor current in order to achieve the actual rotational speed ($n_i$),
   c. comparing the actual value pairs ($n_i$, $T_i$) with stored setpoint value pairs ($n_{setpoint}$, $T_{setpoint}$), and
   d. determining whether a deviation of the actual value pairs ($n_i$, $T_i$) from the setpoint value pairs ($n_{setpoint}$, $T_{setpoint}$) is within or outside the maximum predefined deviation.

4. The detection method according to claim 3, wherein the evaluation of the degree of filter soiling takes place from the power consumption of the fan and by means of a stored fan characteristic curve.

5. The detection method according to claim 2, wherein a reporting of a soiled air filter is output as a signal when the maximum deviation of the actual values from the setpoint values is exceeded.

6. The detection method according to claim 2, wherein the direction of rotation of the fan is reversed for a defined time as compared to a forward rotational direction and, in doing so, the actual degree of modulation, the actual rotational speed, and the intermediate circuit current and the intermediate circuit voltage are continuously recorded.

7. The detection method according to claim 2, wherein a jump in rotational speed is initiated by way of a motor controller with the fan, and a response in a PWM signal to the jump is recorded and evaluated.

8. A detection method for determining filter soiling of a filter system having at least an air filter installed in an air duct and an electrically controlled fan for producing an air flow in the air duct, wherein a motor controller and an evaluating apparatus are provided, having the following steps:
   a. determining an actual rotational speed ($n_i$) of the fan,
   b. determining an actual degree of modulation ($T_i$) of the motor current in order to achieve the actual rotational speed ($n_i$),
   c. comparing the actual value pairs ($n_i$, $T_i$) with stored setpoint value pairs ($n_{setpoint}$, $T_{setpoint}$),
   d. determining whether a deviation of the actual value pairs ($n_i$, $T_i$) from the setpoint value pairs $n_{setpoint}$, $T_{setpoint}$) exceeds a maximum predefined deviation,
   e. recording an intermediate circuit voltage and an intermediate circuit current, and
   f. evaluating the deviation of the actual value pairs ($n_i$, $T_i$) from the setpoint value pairs ($n_{setpoint}$, $T_{setpoint}$) as well as evaluating the intermediate circuit voltage and the intermediate circuit current to obtain a degree of filter soiling.

9. The detection method according to claim 8, wherein a reporting of a soiled air filter is output as a signal when the maximum deviation of the actual values from the setpoint values is exceeded.

10. The detection method according to claim 8, wherein the direction of rotation of the fan is reversed for a defined time as compared to a forward rotational direction and, in doing so, the actual degree of modulation, the actual rotational speed, and the intermediate circuit current and the intermediate circuit voltage are continuously recorded.

11. The detection method according to claim 8, wherein a jump in rotational speed is initiated by way of a motor controller with the fan, and a response in a PWM signal to the jump is recorded and evaluated.

12. The detection method according to claim 8, wherein the degree of filter soiling is obtained from a power consumption of the fan motor without using sensors in that an actual power consumption, which can be determined by the actual value pairs ($n_i$, $T_i$), is compared to a defined setpoint power consumption of an unsoiled filter system in the comparison, which can be determined by the setpoint value pairs ($n_{setpoint}$, $T_{setpoint}$).

* * * * *